United States Patent
Sendonaris

(10) Patent No.: US 7,027,815 B2
(45) Date of Patent: Apr. 11, 2006

(54) COMPENSATING FOR FREQUENCY SHIFT AND TIMING SHIFT IN FREQUENCY AND TIME TRACKING LOOPS BASED ON MOBILE UNIT VELOCITY

(75) Inventor: Andrew Sendonaris, San Jose, CA (US)

(73) Assignee: Qualcomm, Incorporated, san Diego, CA (US)

( * ) Notice: Subject to any disclaimer, the term of this patent is extended or adjusted under 35 U.S.C. 154(b) by 234 days.

(21) Appl. No.: 10/632,421

(22) Filed: Aug. 1, 2003

(65) Prior Publication Data

US 2004/0116121 A1    Jun. 17, 2004

Related U.S. Application Data

(60) Provisional application No. 60/408,608, filed on Sep. 5, 2002, provisional application No. 60/435,005, filed on Dec. 20, 2002.

(51) Int. Cl.
*H04Q 7/20*    (2006.01)

(52) U.S. Cl. .................... 455/441; 455/10; 375/344
(58) Field of Classification Search ............... 455/441, 455/10; 375/147, 344
See application file for complete search history.

(56) References Cited

U.S. PATENT DOCUMENTS

| | | | | |
|---|---|---|---|---|
| 5,513,221 A * | 4/1996 | Parr et al. | ................. | 375/344 |
| 5,689,245 A | 11/1997 | Noreen et al. | ......... | 340/825.49 |
| 5,737,362 A | 4/1998 | Hyun et al. | .................. | 345/206 |
| 6,324,228 B1 * | 11/2001 | Millward et al. | ........... | 375/344 |
| 6,658,045 B1 * | 12/2003 | Jin | .............................. | 375/147 |
| 6,675,013 B1 * | 1/2004 | Gross et al. | ................ | 455/431 |

FOREIGN PATENT DOCUMENTS

| WO | 0201750 | 1/2002 |
|---|---|---|
| WO | 03079570 | 9/2003 |

OTHER PUBLICATIONS

Li, et al. "An Adaptive Filtering Technique for Pilot Aided Transmission Systems", 40$^{th}$ Vehicular Technology Conference, May 1990, pps 507-511.
Oh, et al., "An Adaptive Channel Estimation Scheme for DS-CDMA Systems", 52$^{nd}$ Vehicular Technology Conference, Sep. 2000, pps. 2839-2843.

* cited by examiner

*Primary Examiner*—Erika A. Gary
(74) *Attorney, Agent, or Firm*—Philip Wadsworth; Bruce W. Greenhaus; Richard A. Bachand

(57) ABSTRACT

A method and apparatus are provided for adjusting a communication receiver based on the velocity of a wireless communication device in relation to a base station. The receiver is adjusted by estimating a frequency shift of a communication signal transmitted between the base station and the wireless communication device (WCD) based on the WCD velocity. Using this estimate, adjustments are made to the communication receiver to account for the frequency shift of the communication signal. Adjustments to the receiver can include adjusting frequency and time tracking loops to account for the change in frequency of a signal received by, and from, the WCD as it moves relative to the base station. The receiver may be located in the WCD, or in the network infrastructure, or in both.

47 Claims, 7 Drawing Sheets

COMPENSATING FOR FREQUENCY SHIFT AND TIMING SHIFT IN FREQUENCY AND TIME TRACKING LOOPS BASED ON MOBILE UNIT VELOCITY

RELATED APPLICATIONS

This application claims priority to U.S. Provisional Application No. 60/408,608, filed Sep. 5, 2002, and U.S. Provisional Application No. 60/435,005, filed on Dec. 20, 2002.

BACKGROUND OF THE INVENTION

1. Field of the Invention

The invention relates to wireless communication. In particular, the invention relates to frequency tracking and time tracking in a wireless communication system.

2. Description of the Related Art

Communication over a wireless channel can be accomplished using a variety of techniques which facilitate a large number of users in a limited frequency spectrum. These techniques, commonly referred to as multiple access techniques, include time division multiple access (TDMA), frequency division multiple access (FDMA), and code division multiple access (CDMA).

CDMA offers many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In CDMA and other wireless communication technologies, frequency tracking and time tracking loops are often used to monitor and adjust the frequency and timing of received signals. For example, frequency variations, or errors, often exist in carrier signals transmitted between a wireless communication device (WCD) and a base station. Typically, a frequency tracking loop is used to monitor the frequency variations and frequency sensitive components are adjusted accordingly. In addition, frequency variations can adversely affect timing tracking loops used to maintain timing references in the WCD and the base station.

A major contribution to frequency variations in wireless communications is the Doppler effect. The Doppler effect describes the change in the frequency of a received signal due to a relative velocity between a transmitter and receiver. Thus, if a WCD is mobile, and moving in relation to a base station, the frequency of signal transmitted between the WCD and the base station will vary. For example, if the WCD is moving away from the base station, a signal transmitted from the WCD to the base station would have a lower frequency, i.e. longer wavelength, than the original signal transmitted. Likewise, if the WCD is moving closer to the base station, a signal transmitted from the WCD to the base station would have a higher frequency, i.e. shorter wavelength, than the original signal transmitted. Signals transmitted from the base station to a moving WCD undergo the same frequency variations. Because WCDs are often used in vehicles, or high speed transit systems, correcting for the Doppler effect, or Doppler shift, can be an important factor in maintaining a robust and effective wireless communication system.

There is therefore a need in the art for techniques to provide improved performance of frequency tracking and time tracking loops in WCDs and base stations in a wireless communication system.

SUMMARY OF THE INVENTION

The present invention provides a method and apparatus for adjusting a communication receiver in a wireless communication system according to a velocity of a wireless communication device (WCD) in relation to a wireless network infrastructure, such as a base station. Aspects of the invention include determining the velocity of the WCD and determining a desired set of adjustments to be made to a communication receiver based on the velocity. In accordance with the invention, the communication receiver to be adjusted can be located at various locations in the communication system. For example, the receiver in a WCD can be adjusted, or the receiver at various nodes of the wireless network infrastructure (network) can be adjusted. Determining the velocity of the WCD, and determining one or more adjustments to the operation of a receiver, can be performed at various locations within the network, in the WCD, or in any combination thereof.

For example, in one embodiment, the WCD determines its velocity, and determines desired adjustments to be made to a communication receiver based on the velocity. In a second embodiment, the network determines the velocity of the WCD, and determines desired adjustments to be made to a communication receiver based on the velocity of the WCD. In a third embodiment, the WCD determines its velocity and transmits it to the network. The network then determines desired adjustments to be made to a communication receiver based on the velocity of the WCD. In a fourth embodiment, the network determines the velocity of the WCD and transmits it to the WCD. The WCD then determines desired adjustments to be made to a communication receiver based on the velocity.

The desired adjustments can be used to adjust a communication receiver in either the WCD or the wireless network infrastructure. For example, if the desired adjustments to be made to the communication receiver are determined in the WCD, then the WCD can use the desired adjustments to adjust its receiver, or the desired adjustments can be for use in the network receiver so that the desired adjustments are transmitted to the network and the receiver in the network is adjusted. Similarly, if the desired adjustments to be made to a communication receiver are determined in the network, then the network can use the desired adjustments to adjust its receiver, or the desired adjustments can be for use in the receiver in the WCD so the adjustments are transmitted to the WCD and its receiver is adjusted.

Adjustments to the receiver can include, for example, adjusting frequency and time tracking loops to account for the apparent change in frequency of a signal received by, and from, the WCD as it moves relative to the wireless network infrastructure.

Other features and advantages of the present invention should be apparent from the following description of the preferred embodiment, which illustrates, by way of example, principles of the invention.

DETAILED DESCRIPTION

Figure 1:
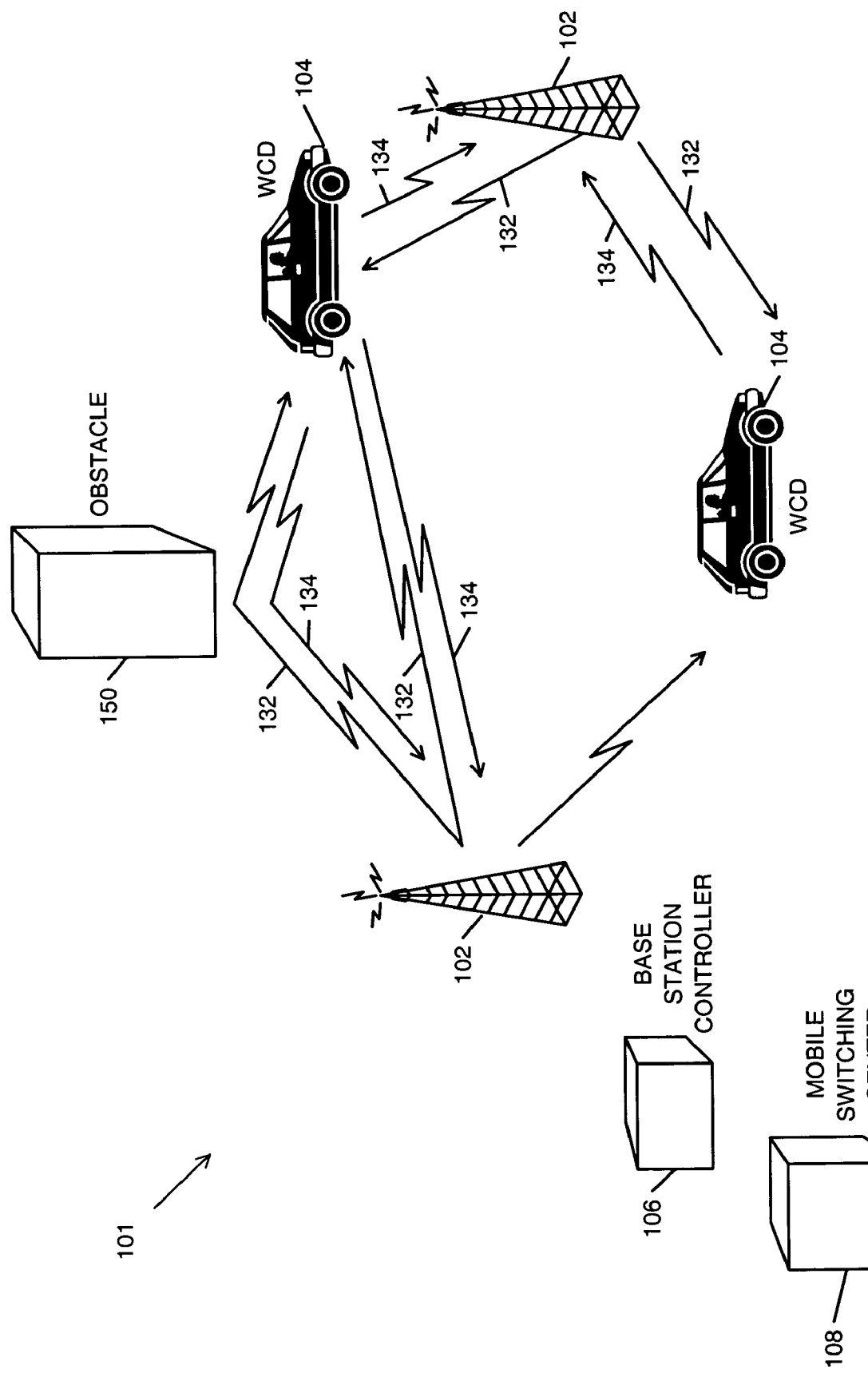
FIG. 1 is a block diagram illustrating portions of a wireless communication system.

In accordance with the invention a frequency tracking technique is described that adjusts a communication receiver according to the velocity of a wireless communication device (WCD) with which communications are taking place. Based on the velocity of the WCD, desired adjustments to the communication receiver are determined Devices in wireless communication systems include receiver units for receiving signals from other system devices. For example, both mobile WCD's and network infrastructure, such as base stations, include receivers. In accordance with the invention, the receiver to be adjusted can be located at various locations in the communication system. For example, the receiver in a WCD can be adjusted, or the receiver at various nodes of the wireless network infrastructure (network) can be adjusted. Determining the velocity of the WCD, and determining one or more adjustments to the operation of a receiver, can be performed at various locations within the network, in the WCD, or in any combination thereof.

For example, in one embodiment, the WCD determines its velocity, and determines desired adjustments to be made to a communication receiver based on the velocity. In a second embodiment, the network determines the velocity of the WCD, and determines desired adjustments to be made to a communication receiver based on the velocity of the WCD.

In a third embodiment, the WCD determines its velocity and transmits it to the network. The network then determines desired adjustments to be made to a communication receiver based on the velocity of the WCD. In a fourth embodiment, the network determines the velocity of the WCD and transmits it to the WCD. The WCD then determines desired adjustments to be made to a communication receiver based on the velocity.

The desired adjustments can be used to make adjustments to the communication receiver in either the WCD or the wireless network infrastructure. For example, if the desired adjustments to be made to the communication receiver are determined in the WCD, then the WCD can use the desired adjustments to adjust its receiver, or the desired adjustments can be for use in the receiver in the network so that the desired adjustments are transmitted to the network and the receiver in the network is adjusted. Similarly, if the desired adjustments to be made to the communication receiver are determined in the network, then the network can use the desired adjustments to adjust its receiver, or the desired adjustments can be for use in the receiver in the WCD so the adjustments are transmitted to the WCD and its receiver is adjusted.

For example, the adjustments to the receiver can include adjusting a frequency tracking loop (FTL), or a time tracking loop (TTL), or both, to account for the apparent change in frequency of a signal received by, and from, the WCD as it moves relative to the wireless network infrastructure.

Determining the velocity of the WCD can be performed in many different ways. For example, an indication of the WCD velocity can be received from a navigational receiver, such as a global positioning system (GPS) receiver, or other types of navigational receivers. In addition, the WCD velocity can be determined from at least two measurements of the location of the WCD that are made at different, known, times. The velocity can be determined from the WCD location measurements and their respective measurement times. Location measurements can be complete location solutions or measurements that are used to compute a location solution. For example, the WCD may make pseudorange measurements from GPS satellites, and transfer the pseudorange measurements, and the measurement times, to the wireless network infrastructure where the pseudorange measurements and GPS information gathered from a GPS receiver at the network are combined to determine the location, and velocity of the WCD are determined. In another example, the network infrastructure can make measurements on signals received form the WCD and determine location measurements of the WCD at different times. The network infrastructure can determine the velocity of the WCD or the network can transmit the location measurement, and respective times, to the WCD where a velocity is determined.

In the description below, various aspects of the invention are described in terms of a wireless communication system based on CDMA. Aspects of the invention may also be used in conjunction with other communication technologies.

FIG. 1 is a block diagram illustrating portions of a wireless communication system 101 that operates in accordance with the present invention. The wireless communication system includes a wireless network infrastructure with multiple base stations 102, and multiple WCDs 104. The wireless network infrastructure also includes other components, such as base station controllers 106, mobile switching centers 108, and the like. Signals 132 transmitted from a base station 102 to a WCD are referred to as the forward link. Signals 134 transmitted from a WCD to a base station are referred to as the reverse link. As illustrated in FIG. 1, both the forward link and the reverse link can travel different, multiple paths between a base station 102 and a WCD. As shown in FIG. 1, forward and reverse link signals may be reflected off an obstacle 150 resulting in multiple instances of the signal being received. This condition is commonly referred to as "multipath" signals. As discussed further below, to accommodate operation in a multipath environment, both base stations and WCDs in a CDMA system use a Rake receiver that processes signals using Rake "fingers" wherein each finger of the rake is assigned to an individual signal. Fingers of the rake receiver may be assigned to different instances of the same signal or to different signals received from different base stations.

Examples of WCDs 104 include cellular telephones, satellite telephones, wireless communication enable personal computers and personal digital assistants (PDA), and other wireless devices. The wireless communication system 101 may be designed to support one or more CDMA standards. For example, the standards may include TIA/EIA-95-B (IS-95), TIA/EIA-98-C (IS-98), $3^{rd}$ Generation Partnership Project (3GPP); $3^{rd}$ Generation Partnership Project 2 (3GPP2), cdma2000, Wideband CDMA (WCDMA), and others.

In accordance with the invention, knowledge of the velocity, speed, of a mobile WCD, or mobile terminal, in a wireless communication system is utilized to improve the performance of frequency tracking and time tracking loops of receivers in the WCD, or receivers in the wireless network infrastructure, or both. For example, in a communication system that operates in accordance with the invention, knowledge of the velocity of a mobile terminal relative to nearby base stations can be used to better estimate the nominal frequency offset of signals received at the mobile terminal and the base stations. Knowledge of the velocity of a mobile terminal relative to the base stations can also be used to select an improved value of a loop filter coefficient for use in a time tracking loop.

Figure 2:
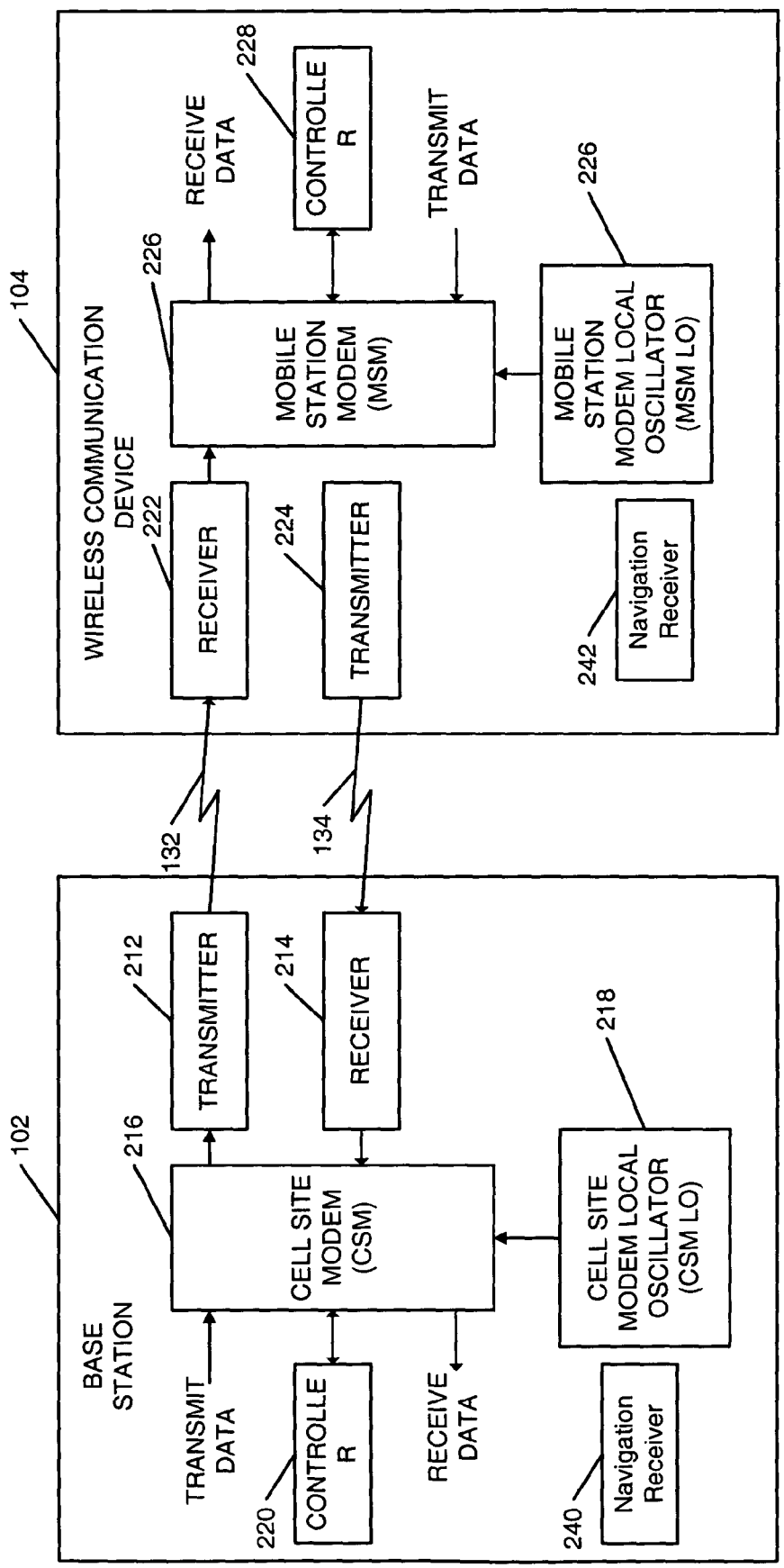
FIG. 2 is a block diagram illustrating additional detail of portions of a wireless communication system.

In a wireless communication system that uses mobile WCDs, the velocity, i.e. speed and direction of the WCD with respect to a base station, results in a change in the apparent frequency of the signal received due to the Doppler shift. FIG. 2 is a block diagram illustrating additional detail of portions of the wireless communication system 101 shown in FIG. 1. FIG. 2 further illustrates a base station 102 and a WCD 104. Included in the base station 102 is a transmitter 212, a receiver 214, a cell site modem (CSM) 216, a cell site modem local oscillator (CSM LO) 218, and a controller 220. The WCD 104 includes a receiver 222, a transmitter 224, a mobile station modem (MSM) 226, a mobile station modem local oscillator (MSM LO) 226, and a controller 228.

To determine the velocity of the WCD, a base station 102 can include a navigation receiver 240, or the WCD 104 can include a navigation receiver 242, or both the base station 102 and the WCD 104 can include navigation receivers 240, 242 respectively. Examples of navigation receivers that may be included in the base station 102 and the WCD 104 include GPS receivers, LORAN receivers, GLONASS receivers, systems that use the network infrastructure to determine the speed of a WCD, and hybrid systems that use various combinations of navigation receivers. The controllers 220 and 228 in the base station 102 and the WCD 104 can be configured to receive information about the velocity of the WCD and to determine adjustments to be made to a receiver. For example, the navigation receivers 240, 242 can receive WCD time and position data from which velocity can be derived.

Frequency Variations in Signals Received at the WCD

In operation, data to be transmitted from the base station 102 to the WCD 104 is input to the CSM 216. The CSM 216 accepts the data to be transmitted and generates a signal that is supplied to the transmitter 212 for transmission to the WCD 104. The CSM 216 uses the oscillator, or clock signal, generated by the CSM LO 218 to control the frequency of the signal that is transmitted to the WCD 104. For example, in a wireless communication system based on WCDMA, the nominal frequency of the signal supplied to the transmitter 212 by the CSM 216 is 2 GHz, based on the clock in the CSM LO 218. However, the clock in the CSM LO 218 may have an error in its frequency. Under the WCDMA standard, the CSM LO error can be as large as about ±100 Hz. Thus the signal 132 transmitted to the WCD 104 may be any frequency within the range of 2 GHZ±100 Hz.

The WCD 104 receives the signal 132 transmitted by the base station 102 in its receiver 122. The received signal is then sent to the MSM 226. The frequency of the signal 132 received by the WCD is the frequency of the signal transmitted by the base station 102, plus any error in the CSM LO, and can also include an additional frequency shift caused by relative velocity between the WCD 104 and the base station 102 due to the Doppler effect. Thus, the frequency of the signal 132 received by the WCD 104 can be represented by Equation (1):

$$f_{received\_WCD} = f_{transmit} + f_{CSM\_LOerror} + f_{doppler} \quad (1)$$

where:

$f_{transmit}$ is the nominal frequency of the CSM LO;

$f_{CSM\_LOerror}$ is the offset of the CSM LO clock from the nominal frequency; and $f_{doppler}$ is the frequency change due to the Doppler effect.

Typically, the WCD 104 performs a frequency tracking loop (FTL) as discussed further below. In one embodiment, the FTL is performed as part of the operation of the MSM 226. In other embodiments the FTL can be separate from the MSM 226. The FTL will synchronize with or "lock" to the frequency of the received signal 132 to assist the receiver in recovering the data that was transmitted by the base station 102. As noted, the frequency that the FTL locks to is the nominal frequency of the CSM LO plus its error, and the Doppler shift. In one embodiment, the frequency to which the FTL locks is used as a reference by the WCD 104 for data to be transmitted to the base station 102.

Frequency Variations in Signals Received at the Network

As discussed below, the FTL in the WCD 104 typically has an error so that the lock frequency will not be exactly the same as the frequency of the signal 132 received. Thus when the frequency that the FTL locks to is used as a reference by the WCD 104, the signal 134 transmitted from the WCD 104 to the base station 102 has an error associated with the FTL operation performed in the WCD 104. In addition, the signal 134 transmitted from the WCD 104 to the base station 102 undergoes a frequency shift if the WCD 104 is moving relative to the base station 102, due to the Doppler effect. It is noted that if the velocity of the WCD 104 relative to the base station 102 has not changed between the time that the WCD 104 receives a signal 132 and the time it transmits a signal 134, then the Doppler shift of both signals will be the same. Thus, the frequency of the signal 134 received by the base station 102, and tracked by a FTL in the base station 102 can be represented by:

$$f_{received\_base\_station} = f_{received\_WCD} + f_{MSM\_FTL\_error} + f_{doppler} \quad (2a)$$

$$f_{received\_base\_station} = f_{transmit} + f_{CSM\_LOerror} + f_{doppler} + f_{MSM\_FTL\_error} + f_{doppler} \quad (2b)$$

$$f_{received\_base\_station} = f_{transmit} + f_{CSM\_LOerror} + 2f_{doppler} + f_{MSM\_FTL\_error} \quad (3)$$

where:

$f_{received\_WCD}$ is the nominal frequency of the signal received by the WCD;

$f_{MSM\_FTL\_error}$ is the offset of the FTL in the WCD;

$f_{doppler}$ is the frequency change due to the Doppler effect.

Compensating for Frequency Variations in Received Signals by Adjusting FTL Operation Examination of Equations (1)–(3) shows that the frequency of signals received at both the WCD 104 and the base station 102 are affected by the Doppler shift due to any relative velocity between the WCD 104 and the base station 102. Knowledge of the relative velocity of the WCD 104, and the corresponding Doppler shift, can be used to improve the performance of the wireless communication system, and improve its robustness by, for example, improving the FTL tracking performance, increasing the FTL pull-in range, and improving performance of time tracking loops, as discussed below.

Figure 3:
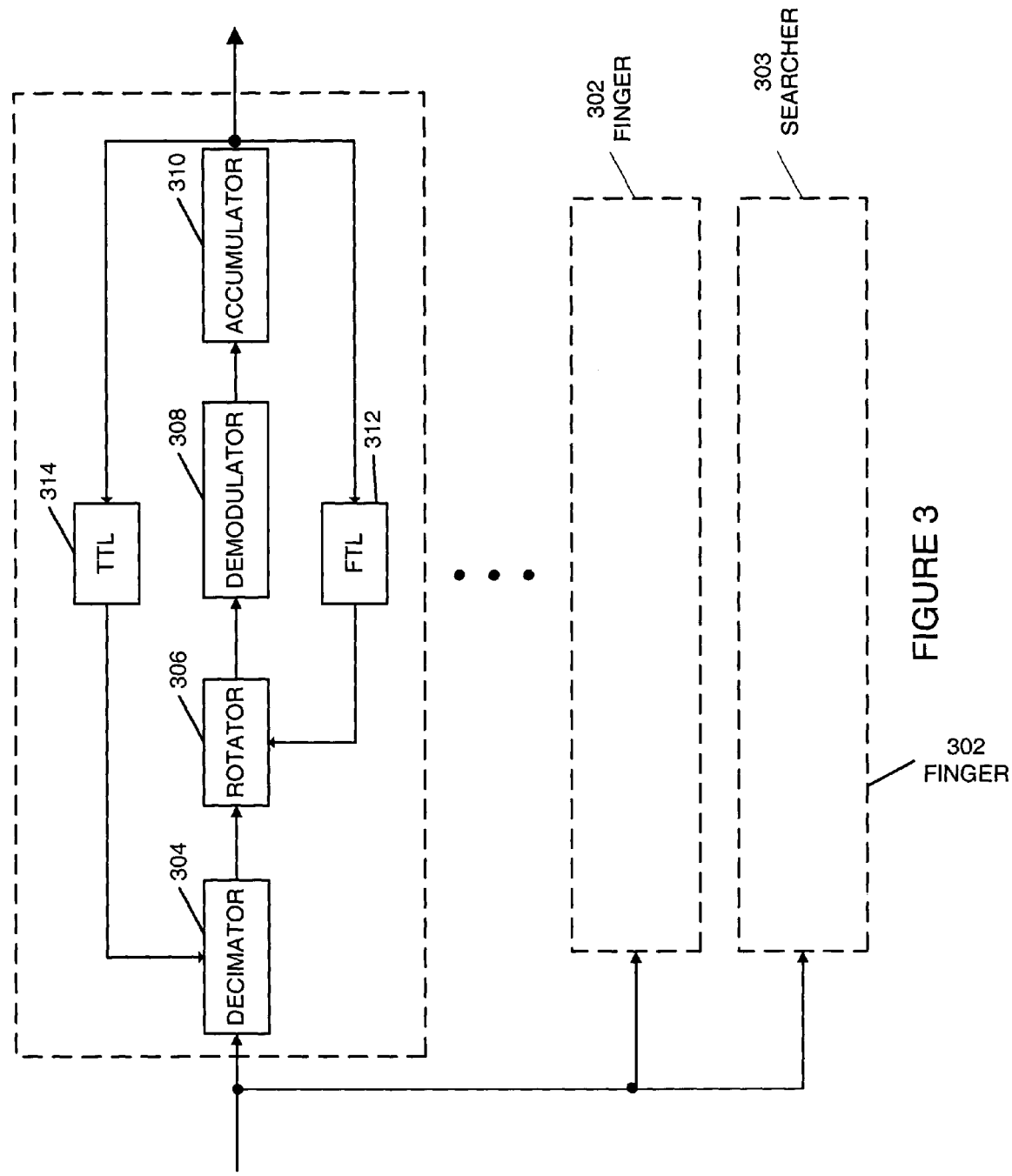
FIG. 3 is a block diagram illustrating portions of a rake receiver.

FIG. 3 is a block diagram illustrating portions of a rake receiver such as can be included in either the base station 102 or the WCD 104. In a rack receiver, multiple signal instances are processed by multiple fingers 302. The rake receiver shown in FIG. 3 also includes a searcher 303. As discussed in further detail below, the searcher 303 processes the received signal and identifies the multipath signal instances that are to be processed by the multiple fingers 302.

The fingers 302 can be implemented in either hardware, software, or a combination of hardware and software. Received data is input to a decimator 304 where desired portions of the received signal are extracted. The output of the decimator 304 is input to a rotator 306. The rotator 306 adjusts the frequency of the received signal to account for frequency errors caused by variations in local clocks and Doppler shifts. The output of the rotator 306 is input to a demodulator 308 where data that was transmitted is extracted from the signal. The output of the demodulator 308 is then accumulated using an accumulator 310.

The output from the accumulator 310 is input to the FTL 312 and the time tracking loop (TTL) 314. As described below, the FTL 312 tracks frequency errors in the received signal and is used to adjust the rotator 306. In addition, the TTL 314 adjusts the timing reference used in the decimator 304 to account for frequency variations in the received signal. Drift in the timing of the received signals due to frequency variations is commonly referred to as code Doppler.

Figure 4:
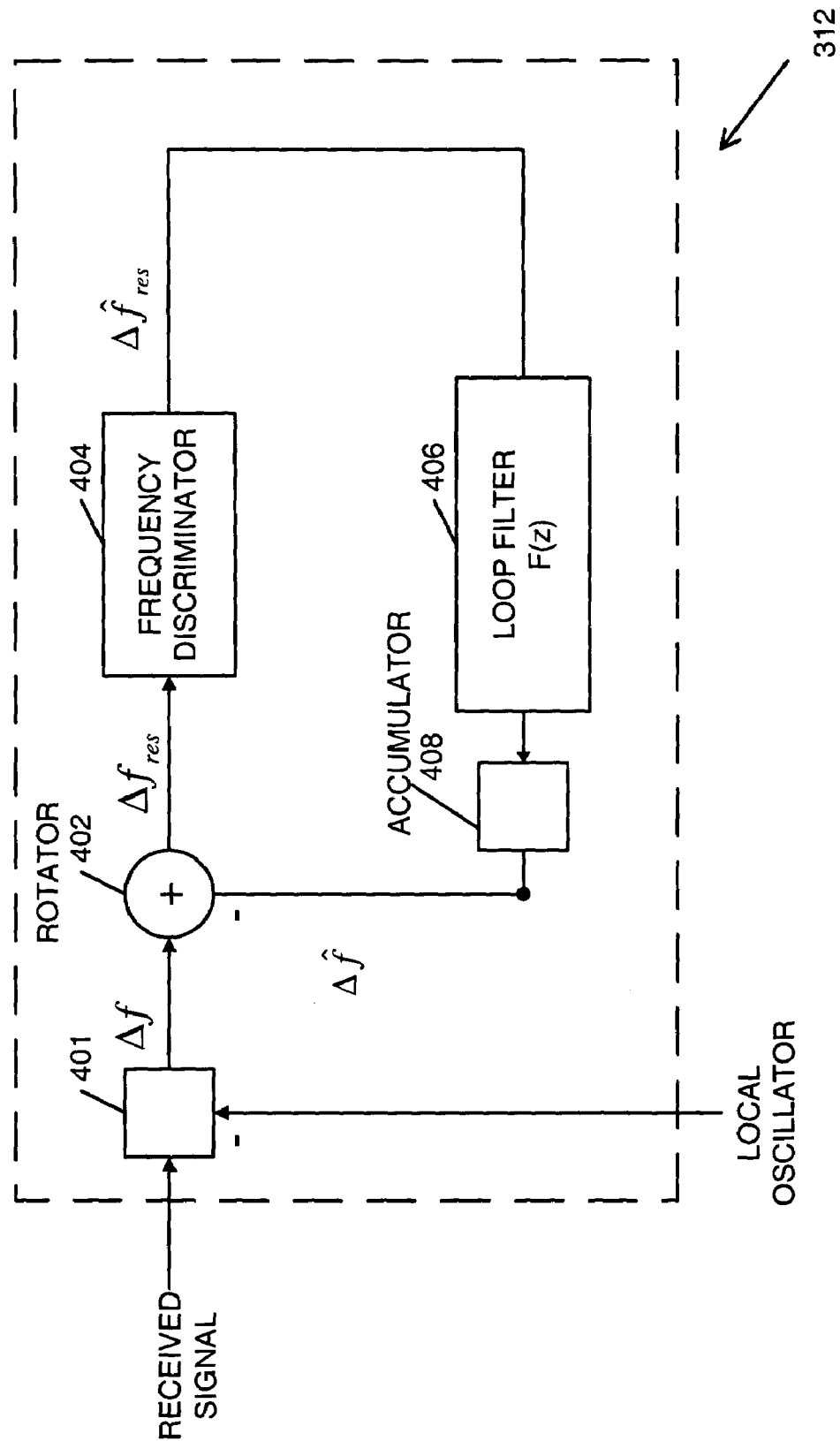
FIG. 4 is a block diagram illustrating one embodiment of a frequency tracking loop that can be used to implement aspects of the invention.

FIG. 4 is a block diagram illustrating one embodiment of a frequency tracking loop 312 that can be used to implement aspects of the invention. The received signal at either the base station 102 or the WCD 104, is input to a downconverter 401 where it is first multiplied with the output of a local oscillator and then low-pass filtered. The signal that is output from downconverter 401 has a frequency that is equal to the difference between the frequency of the received signal and the local oscillator frequency, and is commonly referred to as the frequency error, $\Delta f$. The output of downconverter 401 is fed into one input of a rotator 402. The other input to the rotator 402 is a current estimate of the frequency error $\Delta f$. The output of the rotator 402, is a signal whose frequency equals the difference between the frequency error ($\Delta f$) and the current estimate of the frequency error ($\widehat{\Delta f}$), a quantity which will be referred to as the residual error, $\Delta f_{res}$. In one embodiment, the rotator 402 is implemented by feeding a rake receiver finger front end (FFE) rotator with the phase $-2\pi n T_C \widehat{\Delta f}$, where $T_C$ is the chip period and n is the chip index.

The output of the rotator 402, whose frequency equals $\Delta f_{res}$, is input to a frequency discriminator 404, or other device that can measure the magnitude of the residual error, $\Delta f_{res}$. The output of the frequency discriminator 404 is the current estimate of the residual error denoted as $\widehat{\Delta f_{res}}$. In one embodiment the frequency discriminator can be a cross product discriminator so that:

$$\widehat{\Delta f_{res}} = \mathrm{imag}(y_k y^*_{k-1}) \quad (4)$$

where * denotes the complex conjugation, and $y_k$ are N-chip pilot signals. In WCDMA systems, N is typically a multiple of 256.

The output of the frequency discriminator 404 is input to a loop filter 406. The loop filter 406 suppresses noise and high frequency components that are present in the estimate of the residual frequency, $\widehat{\Delta f_{res}}$. The transfer function of the loop filter 406 is represented by F(z). In one embodiment, the loop filter transfer function is a constant, resulting in a first order FTL. In other embodiments, the loop filter 406 can be configured to be a higher order loop, for example, a second order loop or a third order loop. The output of the loop filter 406 is input to an accumulator 408. The accumulator output is the current estimate of the frequency error, $\widehat{\Delta f}$. The current estimate of the frequency error, $\widehat{\Delta f}$ is one of the inputs to the rotator 402, thus closing the loop and is also output from the FTL to the rotator 306.

Knowledge of the relative velocity between the WCD 104 and the base station 102, and thus knowledge of the associated Doppler shift, can be used to improve the performance of the FTL. For example, knowledge of the velocity of the WCD, and thus the Doppler shift of a received signal can be used by the FTL to provide an improved estimate of the frequency error, $\Delta f$. If an expected Doppler shift value is supplied to the FTL, for example by a controller, not shown, the FTL can predict what the frequency error is going to be. Being able to predict what the frequency error is going to be can improve the performance of the FTL and thus can provide an increase in the demodulated signal to noise ratio (SNR). In addition, knowledge of the expected Doppler shift can be used to initialize the FTL. By effectively subtracting the expected Doppler shift from the received signal, the pull-in range of the FTL can be extended. These advantages are discussed further below.

To illustrate some of the advantages of knowing the Doppler shift of the received signal, an example using typical values from a communication based on WCDMA will be used. Typical WCDMA parameters include:

$$\text{Carrier frequency: } f_{carrier} = 2 \text{ GHz} \quad (5)$$

$$\text{Chip Period: } T_c = \frac{1}{3.84 \times 10^6} \text{ sec} \quad (6)$$

$$\text{Max. PN slew rate at mobile: } s_{max} = \frac{5}{4} \frac{\text{chips}}{\text{sec}} \quad (7)$$

$$\text{Max. LO error at the mobile: } \Delta f_{MSM\_LO} = 0.1 \text{ ppm} \quad (8)$$

$$\text{Max. LO error at the base station: } \Delta f_{CSM\_LO} = 0.05 \text{ ppm} \quad (9)$$

And, if we assume a maximum velocity $v_{max}$ of:

$$v_{max} = 350 \text{ Km/h} \quad (10)$$

The Doppler shift of a signal received at a mobile can be determined by:

$$\Delta f_{Doppler} = \frac{v}{c} f_{carrier} \text{ Hz} \quad (11)$$

where c is the speed of light.

Therefore the maximum Doppler shift experienced at the mobile occurs at the maximum velocity:

$$\Delta f_{Dopper\_MSM\_max} = \frac{350 \text{ Km/h}}{c} f_{carrier} = 0.65 \text{ kHz} \quad (12)$$

As noted earlier the Doppler shift experienced at the base station will generally be twice the Doppler shift at the mobile, thus:

$$\Delta f_{Doppler\_CSM\_max} = 2\frac{350 \text{ Km/h}}{c} f_{carrier} = 1.3 \text{ kHz} \quad (13)$$

In addition to the Doppler shift, the maximum base station LO (local oscillator) error, $\Delta f_{CSM\_LO}$, is 0.05 ppm, which translates into a frequency variation of up to 100 Hz. Also, the maximum LO error for the mobile, $\Delta f_{MSM\_LO}$, is 0.1 ppm, which translates to 200 Hz. Therefore, in the worst case, the received frequency error is:

$$\Delta f_{max} = \Delta f_{Doppler\_CSM\_max} + \Delta f_{CSM\_LO} + \Delta f_{MSM\_LO} = 1.6 \text{ kHz} \quad (14)$$

In addition to the maximum possible frequency error that the FTL will need to be able to track, another quantity of interest is the maximum initial frequency error experienced by the FTL. As the discussion of FIG. 3 noted, a WCD typically includes a searcher 304 that processes the received signal to identify multipath instances that are to be processed by the fingers 302. Generally, the searcher divides its searches into frequency bins and reports results per bin. For example, the searcher might expect a signal to be a predetermined expected frequency, $f_e$. Because the maximum frequency error is $\Delta f_{max}$, the searcher searches the frequency offsets about $f_e$ to up to $f_e \pm \Delta f_{max}$. For example, if the searcher divides its searches into three bins, the bins could be defined as in Equation (15):

$$\left[-\Delta f_{max}, \frac{-f_0}{2}\right], \left[\frac{-f_0}{2}, \frac{f_0}{2}\right], \left[\frac{f_0}{2}, \Delta f_{max}\right] \quad (15)$$

where $f_0$ is the frequency offset used by the searcher to define the search bins. The search results are typically reported as $-f_0$, 0, or $f_0$, depending upon which of the three bins the searcher locates the signal instance: the lower offset bin, the center bin, or the upper offset bin respectively.

Figure 5:
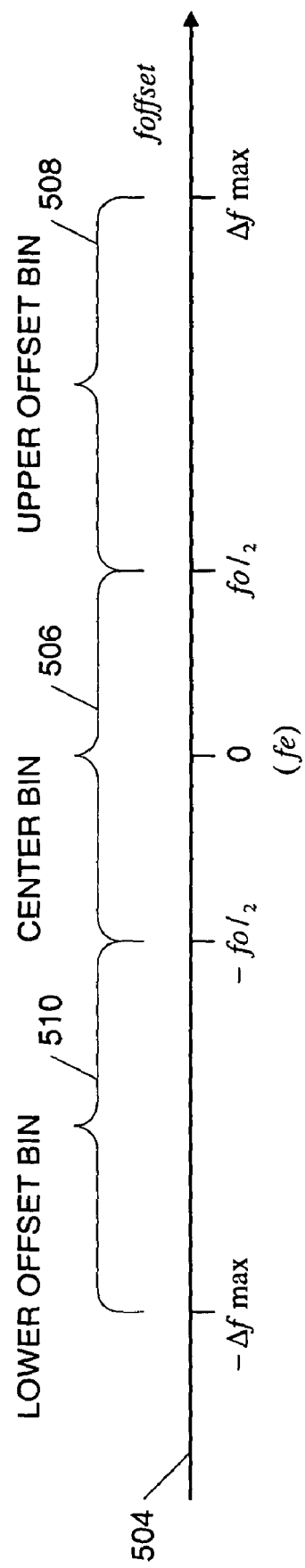
FIG. 5 is a diagram illustrating search bins used by a searcher.

FIG. 5 is a diagram illustrating search bins defined by the searcher 304. The horizontal line 504 represents the frequency offset from the expected frequency, $f_e$, of the signal instance. The entire set of frequency offsets that are searched, $\pm \Delta f_{max}$, can be divided into three search bins, a center bin 506, an upper offset bin 508, and a lower offset bin 510. The bins correspond to frequency offsets from $f_e$ as defined in Equation (15). The maximum error seen by the FTL is either $f_0/2$ if the center bin is reported, or $\max(\Delta f_{max} - f_0, f_0 - f_0/2)$ if either of the two offset bins are reported.

For example, if $f_0$ is set equal to 474 Hz, then the search bins would be at frequency offsets of $-474/2$ to $474/2$ Hz about $f_e$, $474/2$ to 1.6 kHz about $f_e$, and $-474/2$ to $-1.6$ kHz about $f_e$, corresponding to the center bin 506, upper offset bin 508, and lower offset bin 510 respectively. In this example the maximum error seen by the FTL would be 1126 Hz.

It should be noted that bin errors have been ignored, in this discussion. Bin errors occur when the actual frequency error of a path is in a different bin than the one reported by the searcher. The worst case is when the searcher reports $-f_0$ as the frequency offset of a path, whereas the path actually has a frequency error equal to $\Delta f_{max}$, in which case the initial frequency error seen by the FTL is $\Delta f_{max} + f_0$. This results in a maximum error of 2.074 kHz that occurs when $f_0$ of 474 Hz is used. However, the probability of a searcher bin error happening is, by design, very low. In addition, to actually get this worst case we need all the following things to occur: the mobile is traveling at maximum speed, both the MSM and CSM LO's are experiencing the worst allowable frequency error, and the Searcher has a bin error.

Compensating for Frequency Variations in Received Signals by Adjusting TTL Operation The receiver signal frequency error affects the time tracking loop (TTL) in addition to affecting the FTL, but in a slightly different way. Typically, a mobile WCD has a timing reference, based, for example, on the earliest significant signal instance, or first path or finger, it receives. This time reference is denoted by $\tau_o$. When the mobile WCD transmits a signal at time $\tau_0$ the base station receives it at time $\tau_0 + \delta$, where $\delta$ is the delay of the path that the current finger is assigned to. Therefore, in a static situation, $$\tau_{CSM} = \tau_0 + \delta \quad (16)$$

where $\tau_{CSM}$ is the timing reference for the current finger of the CSM. However, due to the mobile WCD motion, the delay $\delta$, changes with time, becoming $\delta(t)$. Also, when a mobile WCD loses the path upon which it was basing its timing reference, it starts slewing to a new timing reference based on another path. This slewing causes $\tau_0$ to change with time, at a rate determined by the slewing rate, thus giving us $\tau_0(t)$. Thus, $\tau_{CSM}$ is:

$$\tau_{CSM}(t) = \tau_0(t) + \delta(t) \quad (17)$$

Equation (19) illustrates that the timing reference at the base station changes with time at a rate determined by the Doppler shift and LO error represented by $\delta(t)$, and by the mobile slewing represented by $\tau_0(t)$. These two factors that affect the base station timing reference can be grouped into one number referred to as an "effective frequency error." The effective frequency error is the frequency error that would result in the same rate of timing reference change in the absence of any PN slewing.

In one embodiment, to determine an effective frequency error, the PN slewing rate is converted to an equivalent value of frequency change imparted by the Doppler shift. For example, for a PN slewing rate of s PN chips/sec, each second expands or contracts by $sT_c$ seconds. For a given $\Delta f_{Doppler}$, each second expands or contracts by $\Delta f_{Doppler}/f_{carrier}$ seconds. Therefore, PN slewing at a rate of PN chips/sec is equivalent to an effective Doppler of $$\Delta f_{slew} = sT_c f_{carrier} \text{ Hz} \quad (18)$$

Thus, the total effective frequency error experienced by the TTL in the base station can be represented by:

$$\Delta f^{TTL} = 2\frac{v}{c} f_{carrier} + \Delta f_{CSM\_LO} + \Delta f_{MSM\_LO} + sT_c f_{carrier} \text{ Hz} \quad (19)$$

As illustrated in equation (21) the total effective frequency error seen by the base station includes the error due to the Doppler shift $$\left(2\frac{v}{c} f_{carrier}\right),$$

the base station local oscillator error ($\Delta f_{CSM\_LO}$), the WCD local oscillator error ($\Delta f_{MSM\_LO}$), and the PN slewing rate ($sT_c f_{carrier}$). For example, for a mobile speed of 100 Km/h and a slewing rate of 5/4 chips per second, the total effective frequency error for the TTL is:

$$\Delta f^{TTL} = 2\frac{100 \times 10^3/3600}{3 \times 10^8} 2 \times 10^9 + .02 \times 10^{-6}(2 \times 10^9) + \qquad (20)$$

$$.1 \times 10^{-6}(2 \times 10^9) + \frac{5}{4}\left(\frac{1}{3.84 \times 10^6}\right)(2 \times 10^9)$$

$$= 1.3 \text{ kHz}$$

In addition, for a maximum mobile speed of 350 km/h the total effective frequency error for the TTL becomes approximately 2.25 kHz. Therefore, $$\Delta f_{max}^{TTL} = 2.25 \text{ kHz} \qquad (21)$$

Figure 6:
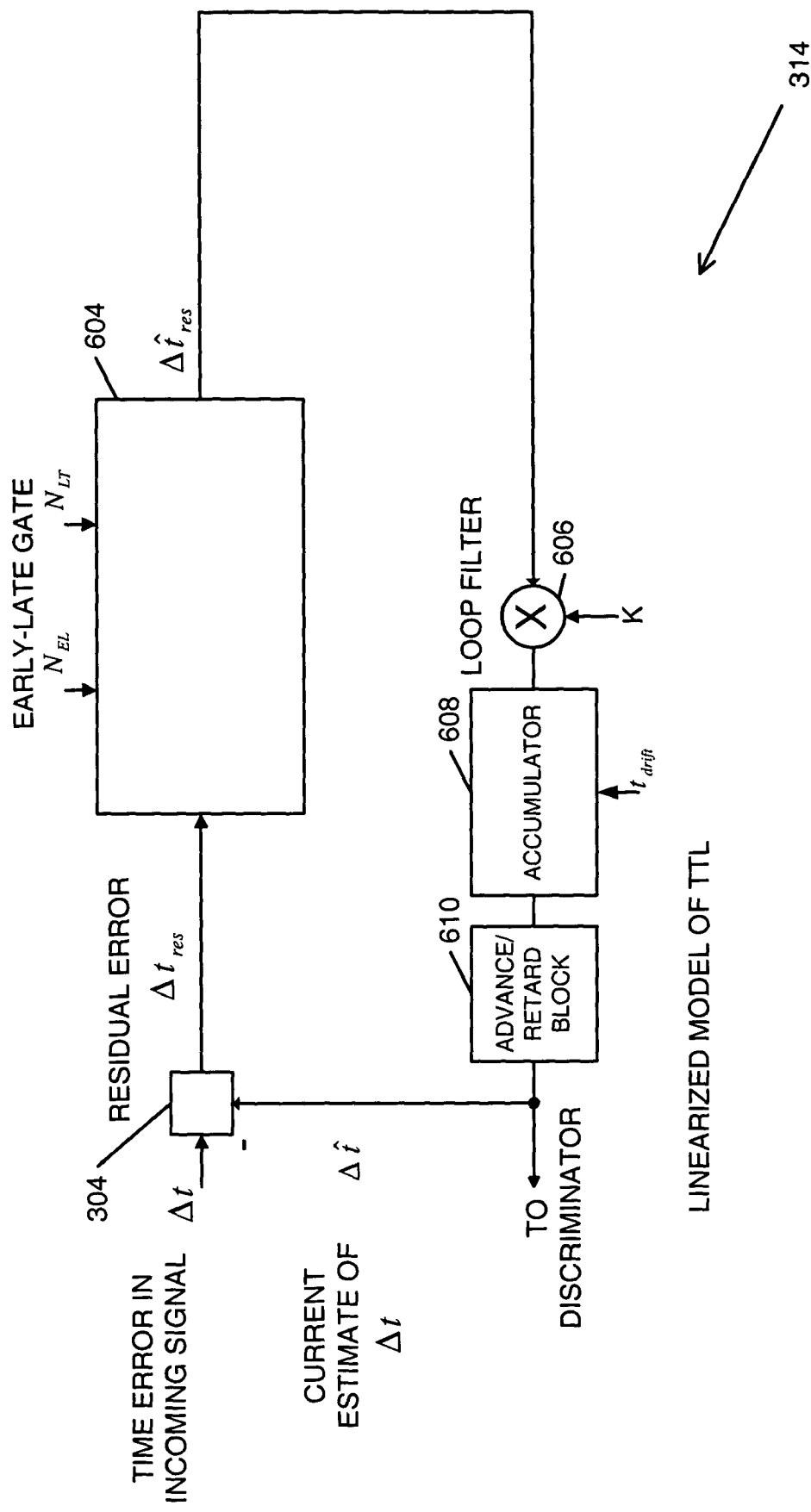
FIG. 6 is a block diagram illustrating a time tracking loop that can be used to implement aspects of the invention.

FIG. 6 is a block diagram illustrating a time tracking loop (TTL) 314, as shown in FIG. 3, that can be used to implement aspects of the invention. The received signal, at either the base station 102 or the WCD 104, has a timing offset denoted by $\Delta t$ and is input into a decimator 304. The decimator 304 decimates the received signal according to the current estimate of the time offset ($\Delta \hat{t}$). The resulting signal, that is, the output of decimator 304, has a timing error that is equal to the difference between $\Delta t$ and $\Delta \hat{t}$. This timing error is referred to as the residual error, $\Delta t_{res}$.

The output of decimator 304, which has a residual error, $\Delta t_{res}$, is input to an Early-Late gate 604. In one embodiment the early-late gate operates on $N_c$ chip early and late pilot symbols. The output of the early-late gate is given by:

$$\Delta t_{res} = S(\Delta t_{res}, n_{EL}, n_{LT}) \qquad (22)$$

Where $n_{EL}$ and $n_{LT}$ are the noise components of the early and late symbols respectively. In Equation (22) the transfer function of the S-curve depends on the type of timing discriminator used. In one embodiment, the timing discriminator is an energy difference timing discriminator (EDTD). In another embodiment, the timing discriminator is a magnitude difference timing discriminator (MDTD). In yet another embodiment the timing discriminator is a magnitude-approximation difference timing discriminator (MADTD).

The output of the early-late gate 604, the current estimate of the residual error denoted as $\Delta t_{res}$, is input to a loop filter 606. If a first order TTL is used, the loop filter is simply a coefficient denoted by K. The coefficient K is preferably varied in response to the speed of the mobile WCD. For example, as the speed of the mobile WCD increases, the value of K will increase, resulting in less filtering so that the loop will be more responsive to changes. Likewise, if the speed of the mobile WCD decreases the value of K will decrease, resulting in a slower loop response but providing improved noise suppression characteristics. Knowledge of the speed of the mobile WCD can be used to improve the selection of a value of K. For example, if the speed of the mobile is not known then a value of K would be selected that would work adequately in most situations, resulting in a non-optimal value for K. By knowing the speed of the mobile WCD an optimal value of K can be selected.

The output of the loop filter 606 is input to an accumulator 608. Another input to the accumulator 608 is $t_{drift}$. The value of $t_{drift}$ is used to account for drift in the timing of the received signal due to a Doppler shift in the received frequency. Drift in the timing of the received signal due to a Doppler shift in the received signal is commonly referred to as code Doppler. One technique for selecting a value for $t_{drift}$ is to estimate the timing drift based on the frequency shift. Another technique for selecting a value for $t_{drift}$ is to determine the speed of the WCD and estimate the timing drift based on the speed.

The output of the accumulator 608 is input to an advance/retard block 610. The advance/retard block 610 outputs the current estimate of the timing offset, $\Delta \hat{t}$, and is input to the decimator 304 in the rake receive fingers 302.

Knowledge of the relative velocity between the WCD 104 and the base station 102 can be used to improve the performance of the TTL. For example, knowledge of the velocity of the WCD, and thus the Doppler shift of a received signal, can be used by the TTL to provide an improved estimate of the timing offset $\Delta \hat{t}$. If an expected Doppler shift value is supplied to the FTL, for example by a controller, not shown, the TTL can select an improved value for use as the loop filter coefficient K. In addition, knowledge of the expected Doppler shift can be used to improve selection of a value for $t_{drift}$. Improving the selection of K and $t_{drift}$ can result in improved TTL performance, for example improved signal to noise ration (SNR) and pull-in range of the TTL. These and other advantages are discussed further below.

In one embodiment, a first-order TTL is used. In other embodiments, higher order TTL can be used. In a first order TTL the loop performance is largely controlled by the TTL coefficient. In general, the value of the TTL coefficient will be constant over the entire range of SNRs that the loop will operate over. It will also be constant over the entire range of frequency errors (Doppler) that the loop will operate over, if knowledge of the mobile WCD's velocity is not used. Therefore, if we do not use information about the WCD's velocity, it would be beneficial to choose a value for the TTL coefficient that keeps the SNR loss as small as possible under all possible SNR and Doppler scenarios. However, no single value for the TTL coefficient will be best for all mobile WCD speeds as reflected in the Doppler shift, thus necessitating the use of a compromise value for the TTL coefficient.

Using knowledge of the velocity of the WCD in relation to the base station, a TTL may be designed that will exceed the performance of a TTL that does not use this knowledge, by choosing the best TTL coefficient for each value of the velocity and not having to use a compromise value that would be constant over all velocities.

Figure 7:
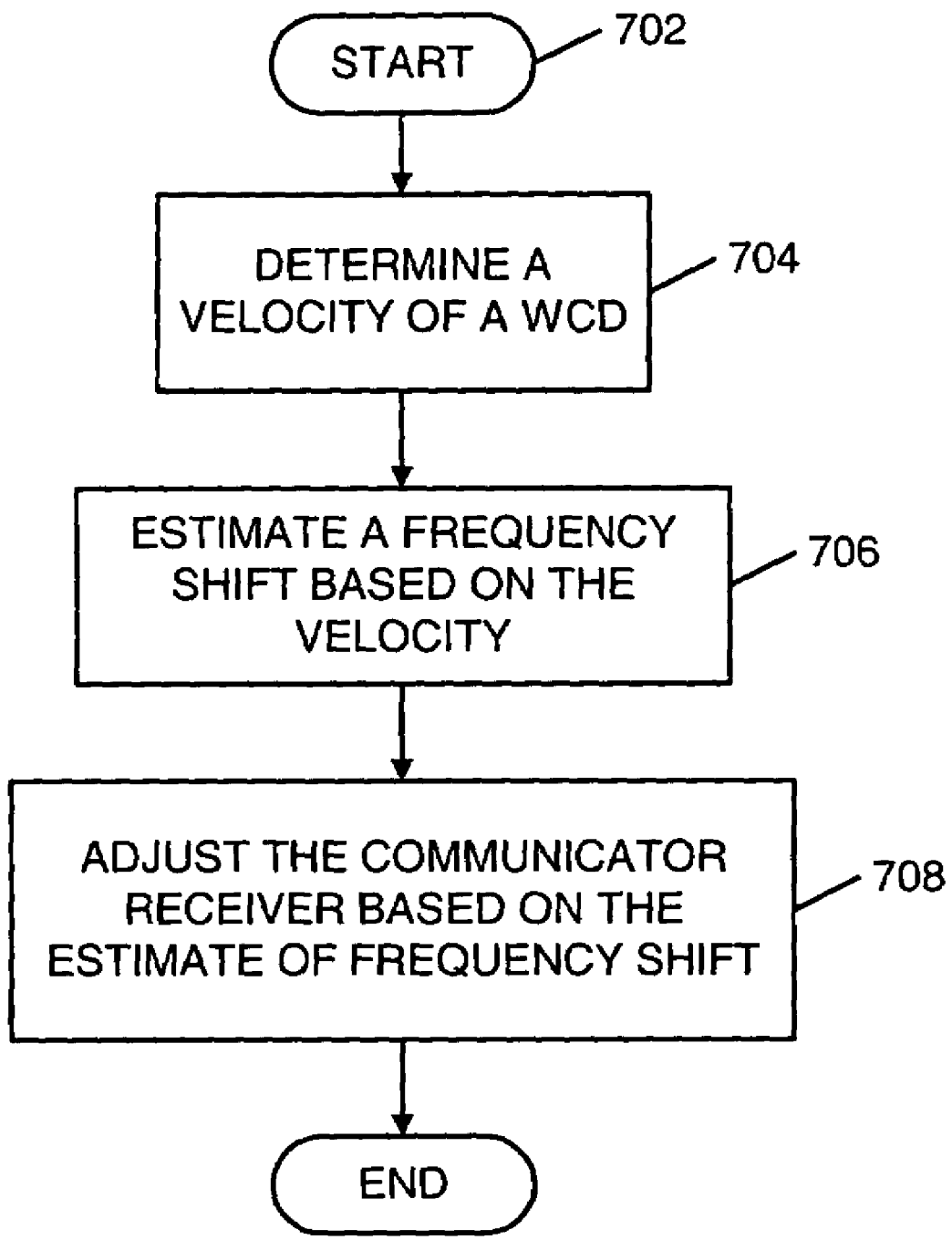
FIG. 7 is a flow diagram illustrating a frequency tracking technique in accordance with the invention.

FIG. 7 is a flow diagram illustrating a frequency tracking technique in accordance with the invention. Flow begins in block 702 where a frequency tracking operation is initiated. Flow continues to block 704 where the velocity of the WCD is determined. As described above, the determination may take place at various locations of the communication system, such as in a WCD, or in the wireless network infrastructure, for example, in a base station. Then, in block 706, an estimate of a frequency shift due to the velocity of the WCD relative to the base station is made. In block 708 the estimated frequency shift is used to adjust the communications receiver of the WCD or the base station. For example, the estimated frequency shift may be used in the FTL and the TTL.

Various frequency and time tracking techniques have been described as being implemented in hardware. The techniques, however, could alternatively be implemented in software, firmware, or any combination of software and hardware. If implemented in software, the techniques may be embodied in program code initially stored on a computer readable medium such as a hard drive, or other disk or tape media. For example, the program code can be loaded into memory from electronic computer-readable media such as EEPROM, or downloaded over a network connection.

If the technique is implemented in program code, the processor that executes the program code may take the form of a microprocessor and can be integrated with, or form part of, a wireless computer, a WCD, a base station, or the like.

If the technique is implemented in hardware it may be implemented in, for example, a digital signal processor (DSP), an application specific integrated circuit (ASIC), a field programmable gate array (FPGA), a programmable logic device, specifically designed hardware components, or any combination thereof.

The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come with the meaning and range of equivalency of the claims are to be embraced within their scope.

We claim:

1. A method of adjusting a communication receiver, the method comprising:
    receiving multipath signals at a rake receiver;
        determining a velocity, from GPS data, of a wireless communication device in relation to a wireless network infrastructure; and
        determining one or more adjustments to the operation of the communication receiver, using the multipath signal s, based on the determined velocity of the wireless communication device.

2. A method as defined in claim 1, wherein determining the velocity of the wireless communication device and determining adjustments to the communication receiver are performed in the wireless communication device.

3. A method as defined in claim 1, wherein determining the velocity of the wireless communication device and determining adjustments to the communication receiver are performed in the wireless network infrastructure.

4. A method as defined in claim 1, wherein determining the velocity of the wireless communication device is performed in the wireless communication device, and determining adjustments to the communication receiver are performed in the wireless network infrastructure.

5. A method as defined in claim 1, wherein determining the velocity of the wireless communication device is performed in the wireless network infrastructure, and determining adjustments to a communication receiver are performed in the wireless communication device.

6. A method as defined in claim 1, further comprising estimating a frequency shift based on the velocity of the wireless communication device.

7. A method as defined in claim 6, wherein estimating the frequency shift is performed in the wireless communication device.

8. A method as defined in claim 6 wherein estimating the frequency shift is performed in the wireless network infrastructure.

9. A method as defined in claim 1, further comprising adjusting the communication receiver in accordance with the determined adjustments.

10. A method as defined in claim 9, wherein adjusting the communication receiver is performed in the wireless communication device.

11. A method as defined in claim 9, wherein adjusting the communication receiver is performed in the wireless network infrastructure.

12. A method as defined in claim 1, wherein the determined adjustments to the communication receiver further comprises adjustments to a frequency tracking loop.

13. A method as defined in claim 12, wherein adjusting the frequency tracking loop further comprises estimating an initial frequency error for the flaking loop based on the velocity of the wireless communication device.

14. A method as defined in claim 12, wherein adjusting the frequency tracking loop further includes estimating a frequency error for the tracking loop based on the velocity of the wireless communication device.

15. A method as defined in claim 1, wherein the determined adjustments to the communication receiver further comprises adjustments to a time tracking loop.

16. A method as defined in claim 15, wherein adjusting the time tracking loop further comprises estimating an initial timing error for the tracking loop based on the velocity of the wireless communication device.

17. A method as defined in claim 15, wherein adjusting the time tracking loop further includes estimating a timing error for the tracking loop based on the velocity of the wireless communication device.

18. A method as defined in claim 1, wherein determining the velocity further comprises receiving velocity information from a global positioning system receiver.

19. A method as defined in claim 1, wherein determining the velocity further comprises receiving at least two location measurements of the wireless communication device, wherein the measurements are made at different known, times, and determining the velocity of the wireless communication device is based on the at least two location measurements and their respective measurement times.

20. A method as defined in claim 1, wherein the wireless network infrastructure further comprises a base station.

21. A method of adjusting a communication receiver, the method comprising:
    receiving multipath signals at a rake receiver;
        determining, from GPS data, one or more adjustments to the operation of the communication receiver, using the multipath signals, based on a velocity of a wireless communication device in relation to a wireless network infrastructure; and
    adjusting the communication receiver in accordance with the determined adjustments.

22. A method as defined in claim 21, wherein the velocity of the wireless communication device is determined in the wireless communication device.

23. A method as defined in claim 21, wherein the velocity of the wireless communication device is determined in the wireless network infrastructure.

24. A method as defined in claim 21, further comprising determining the velocity of the wireless communication device based on velocity information received from a global positioning system receiver.

25. A method as defined in claim 21, further comprising determining the velocity of the wireless communication device based on at least two location measurements of the wireless communication device, wherein the measurements are made at different, known, times, and determining the velocity of the wireless communication device is based on the at least two location measurements and their respective measurement times.

26. A method as defined in claim 21, further comprising estimating a frequency shift of a communication signal transmitted between the wireless network infrastructure and the wireless communication device based on the velocity of the wireless communication device.

27. A method as defined in claim 26, wherein estimating a frequency shift is performed in the wireless communication device.

28. A method as defined in claim 26, wherein estimating a frequency shift is performed in the wireless network infrastructure.

29. A wireless communication device comprising:
   a rake receiver configured to receive communication signals, including GPS data, from a base station; and
   a controller configured to receive a velocity of the wireless communication device, as determined using the GPS data, and to determine adjustments to be made to the receiver.

30. A wireless communication device as defined in claim 29, further comprising estimating a frequency of a received communication signal based on the velocity.

31. A wireless communication device as defined in claim 29, further comprising adjusting the receiver in accordance with the determined adjustments.

32. A wireless communication device as defined in claim 29 wherein the determined adjustments to be made to the communication receiver comprises adjusting a frequency tracking loop.

33. A wireless communication device as defined in claim 32, wherein adjusting the frequency tracking loop comprises estimating an initial frequency error for the tracking loop based on the velocity of the wireless communication device.

34. A wireless communication device as defined in claim 32, wherein adjusting the frequency tracking loop comprises estimating a frequency error for the tracking loop based on the velocity of the wireless communication device.

35. A wireless communication device as defined in claim 29, wherein the determined adjustments to be made to the communication receiver comprises adjusting a time tracking loop.

36. A wireless communication device as defined in claim 35, wherein adjusting the time tracking loop comprises estimating an initial timing error for the tracking loop based on the velocity of the wireless communication device.

37. A wireless communication device as defined in claim 35, wherein adjusting the time tracking loop comprises estimating a timing error for the tracking loop based on the velocity of the wireless communication device.

38. A wireless network infrastructure comprising:
   a rake receiver configured to receive communication signals including GPS data, from at least one wireless communication device; and
   a controller configured to receive the wireless communication device velocity, as determined using the GPS data, and to determine adjustments to be made to the receiver.

39. A wireless communication device as defined in claim 38, further comprising estimating a frequency of received communication signal based on the velocity.

40. A wireless communication device as defined in claim 38, further comprising adjusting the receiver in accordance with the determined adjustments.

41. A wireless communication device as defined in claim 38 wherein the determined adjustments to be made to the communication receiver comprises adjusting a frequency tracking loop.

42. A wireless communication device as defined in claim 41, wherein adjusting the frequency tracking loop comprises estimating an initial frequency error for the tracking loop based on the velocity of the wireless communication device.

43. A wireless communication device as defined in claim 41, wherein adjusting the frequency tracking loop comprises estimating a frequency error for the tracking loop based on the velocity of the wireless communication device.

44. A wireless communication device as defined in claim 38, wherein the determined adjustments to be made to the communication receiver comprises adjusting a time tracking loop.

45. A wireless communication device as defined in claim 44, wherein adjusting the time tracking loop comprises estimating an initial timing error for the tracking loop based on the velocity of the wireless communication device.

46. A wireless communication device as defined in claim 44, wherein adjusting the time tracking loop comprises estimating a timing error for the tracking loop based on the velocity of the wireless communication device.

47. A wireless network infrastructure as defined in claim 38, wherein the network infrastructure further comprises base station.

* * * * *